US010999307B2

(12) United States Patent
Drake et al.

(10) Patent No.: US 10,999,307 B2
(45) Date of Patent: May 4, 2021

(54) NETWORK ASSESSMENT SYSTEMS AND METHODS THEREOF

(71) Applicant: Infinite Group, Inc., Pittsford, NY (US)

(72) Inventors: Brian A. Drake, Rochester, NY (US); Mark E. Klein, Rush, NY (US); Andrew T. Hoyen, Fairport, NY (US); James A. Villa, Rochester, NY (US); Julian D. Baldwin, Rochester, NY (US)

(73) Assignee: INFINITE GROUP, INC., Pittsford, NY (US)

( * ) Notice: Subject to any disclaimer, the term of this patent is extended or adjusted under 35 U.S.C. 154(b) by 61 days.

(21) Appl. No.: 15/600,297

(22) Filed: May 19, 2017

(65) Prior Publication Data

US 2017/0339180 A1  Nov. 23, 2017

Related U.S. Application Data

(60) Provisional application No. 62/338,904, filed on May 19, 2016.

(51) Int. Cl.
| | | |
|---|---|---|
| *H04L 29/08* | (2006.01) | |
| *H04L 29/06* | (2006.01) | |
| *G06F 21/57* | (2013.01) | |
| *H04L 12/24* | (2006.01) | |

(52) U.S. Cl.
CPC .......... *H04L 63/1433* (2013.01); *G06F 21/57* (2013.01); *H04L 41/0853* (2013.01); *H04L 41/142* (2013.01); *H04L 41/12* (2013.01); *H04L 67/025* (2013.01)

(58) Field of Classification Search
CPC .................. H04L 63/1433; H04L 41/0853
USPC ...................................... 726/22–25
See application file for complete search history.

(56) References Cited

U.S. PATENT DOCUMENTS

| | | | | |
|---|---|---|---|---|
| 9,537,876 B2* | 1/2017 | Kelekar | ............. | H04L 63/1408 |
| 2003/0212910 A1* | 11/2003 | Rowland | ............. | H04L 63/1408 |
| | | | | 726/22 |
| 2014/0215065 A1* | 7/2014 | Fisher | ................... | H04L 12/281 |
| | | | | 709/224 |

* cited by examiner

*Primary Examiner* — Anthony D Brown
(74) *Attorney, Agent, or Firm* — Troutman Pepper Hamilton Sanders LLP (Rochester)

(57) ABSTRACT

A method for assessing a network environment includes obtaining, by the network assessment computing device, device information for one or more devices each with an Internet Protocol address currently on a defined network in a network environment from a network appliance device coupled to the network environment. Each of the identified devices are assessed, by the network assessment computing device, for one or more vulnerabilities. Network status data and any actionable items for the identified devices for the one or more vulnerabilities is generated, by the network assessment computing device, based on the assessing. The generated status data and any actionable items are provided by the network assessment computing device.

27 Claims, 11 Drawing Sheets

☆ Step Includes LCD Messages

LCD Display

The LCD screen on the device displays informational messages about the network and scans being run. The messaging system uses a custom queuing system allowing message prioritization.

| nodeWare™ | Customer Profiles | | | | |
| --- | --- | --- | --- | --- | --- |
| | Click on a customer below to update their information. | | | | |
| Customers | Company Name | Full Name | Email | Phone | Address | Status |
| Reporting | Smith & Smith Law | John Smith | HQ@IHG.com | 585-111-2222 | 12 Home St Rochester, NY 14618 | Active |
| Support | UrClinic Healthcare | Demo Customer | dcustomer@nodeware.com | | , AL | Active |
| | WeMakeItGood Mfg. | Demo Customer | dcustomer@nodeware.com | | , AL | Active |
| | Infinite Group, Inc | Demo Customer | dcustomer999@nodeware.com | | , AL | Inactive |
| nodeware | | | | | |

FIG. 6

FIG. 11 nodeWare™
- Internal
- External
- Reporting
- Alerts
- Support

Node Health
877 / 1000

Check for SSL Weak Ciphers  [Medium]
CVE-2016-2183
Port 8443/tcp

[Accept Risk]

F8:72:EA:86:BF:BF | May 8, 2017, 10:18 a.m. | 10.10.0.2 | ○ Online

Summary
The DES and Triple DES ciphers, as used in the TLS, SSH, and IPSec protocols and other protocols and products, have a birthday bound of approximately four billion blocks, which makes it easier for remote attackers to obtain cleartext data via a birthday attack against a long-duration encrypter session, as demonstrated by an HTTPS session using Triple DES in CBC mode, aka a "Sweet32" attack.

Description
Weak ciphers offered by this service: TLS1_RSA_RC4_128_SHA

Solution
The configuration of this services should be changed so that it does not support the listed weak ciphers anymore. For more info click here.

8444/tcp This routine search for weak SSL ciphers offered by a service.

■ demo

NETWORK ASSESSMENT SYSTEMS AND METHODS THEREOF

This application claims the benefit of U.S. Provisional Patent Application Ser. No. 62/338,904, filed May 19, 2016, which is hereby incorporated by reference in its entirety.

FIELD

This technology relates to network assessment systems and methods thereof.

BACKGROUND

Network assessments typically involve processes to protect a network environment from unauthorized access, misuse, modification, or destruction. Although there are a large number of available prior network assessment systems, they often are not as effective and robust as needed to provide timely assessments or a secure network environment. Additionally, these prior network assessment systems are not able to provide actionable items for taking corrective action in a timely enough manner. Further, these prior network assessment systems are often difficult and cumbersome to install within a defined network environment and are unable to efficiently track and manage new systems, devices, and/or other hosts.

SUMMARY

A method for assessing a network environment includes obtaining, by the network assessment computing device, device information for one or more devices each with an Internet Protocol address currently on a defined network in a network environment from a network appliance device coupled to the network environment. Each of the identified devices are assessed, by the network assessment computing device, for one or more vulnerabilities. Network status data and any actionable items for the identified devices for the one or more vulnerabilities is generated, by the network assessment computing device, based on the assessing. The generated status data and any actionable items are provided by the network assessment computing device.

A network assessment computing system includes a network scanning appliance and a memory comprising programmed instructions stored in the memory and one or more processors coupled to the network appliance device and configured to be capable of executing the programmed instructions stored in the memory to obtain device information for one or more devices each with an Internet Protocol address currently on a defined network in a network environment from a network appliance device coupled to the network environment. Each of the identified devices are assessed for one or more vulnerabilities. Network status data and any actionable items for the identified devices for the one or more vulnerabilities is generated based on the assessing. The generated status data and any actionable items are provided.

A non-transitory computer readable medium having stored thereon instructions for assessing a network environment comprising executable code which when executed by one or more processors, causes the processors to perform steps including obtaining device information for one or more devices each with an Internet Protocol address currently on a defined network in a network environment from a network appliance device coupled to the network environment. Each of the identified devices are assessed for one or more vulnerabilities. Network status data and any actionable items for the identified devices for the one or more vulnerabilities is generated based on the assessing. The generated status data and any actionable items are provided.

This technology provides a number of advantages including network assessment computing systems, methods, and non-transitory computer readable media that provide a simple, continuous, intuitive digital representation of the internal and external security protection and health of a network environment. With this technology, a simple, continuous, intuitive digital representation of internal and/or external security protection and health of a computer based network is provided. This technology is able to deliver pertinent information about vulnerable computers, phones, tablets, mainframes, HVAC systems, cameras, televisions or any device that has an Internet Protocol (IP) address in near real time or in real time enabling an administrator or other user to take action, such as preventing unauthorized access to device(s) in the network.

BRIEF DESCRIPTION OF THE DRAWINGS

FIG. 6 is a screenshot of an example of a graphical user interface showing a representation of customer profiles;

FIG. 11 is a screenshot of an example of a graphical user interface showing a representation of node health with a risk level of an identified vulnerability.

DETAILED DESCRIPTION

Figure 1:
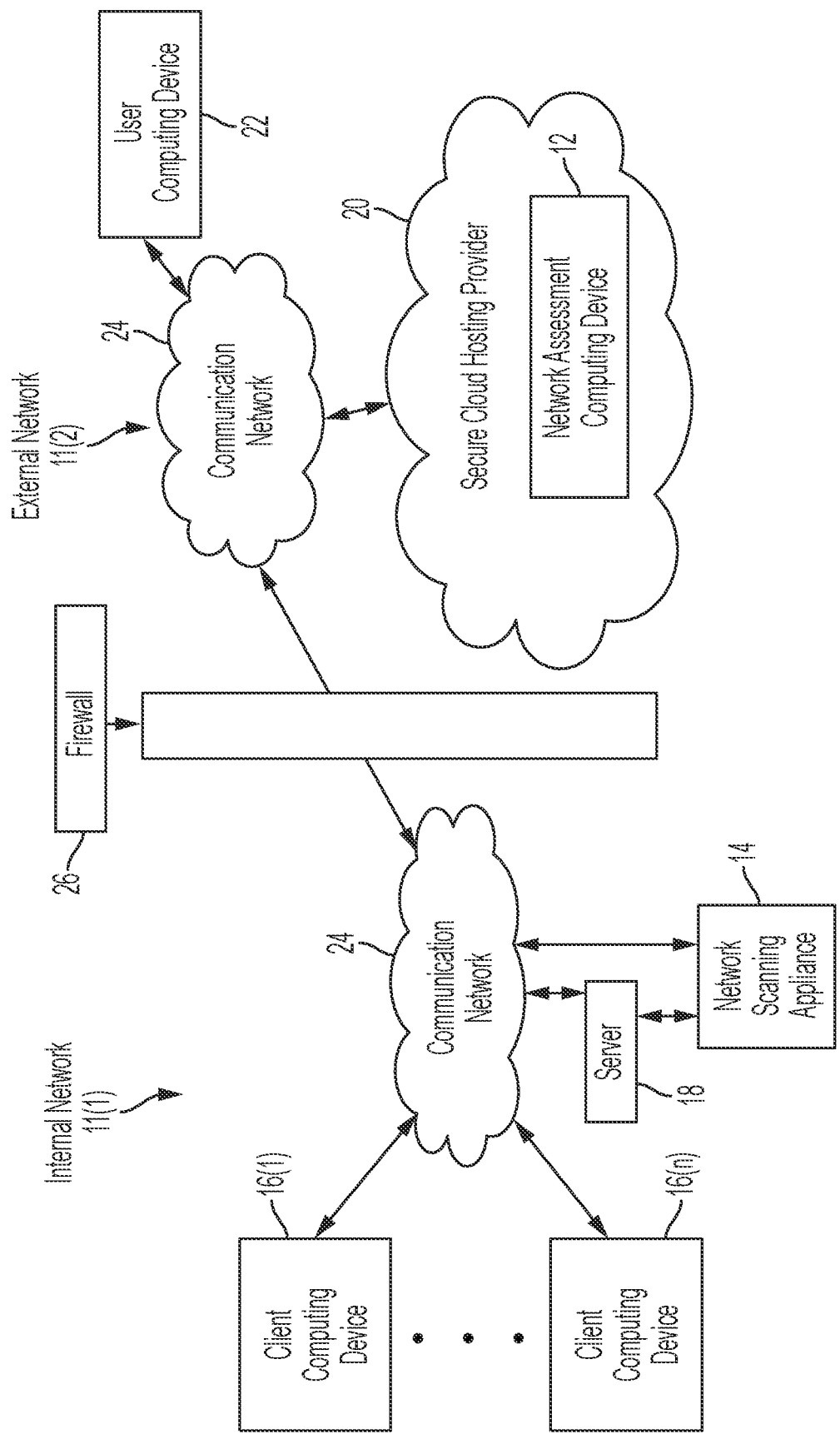
FIG. 1 is a block diagram of an example of a network environment with examples of a network assessment computing device and a network appliance device.

An example of a network environment 10 has internal and external networks 11(1)-11(2) and a network assessment computing device 12 coupled to interact with network appliance device 14 are illustrated in FIGS. 1-4. In this particular example, the network environment 10 includes the network assessment computing device 12, the network appliance device 14, client computing devices 16(1)-16(n), a server 18, a secure cloud hosting provider 20, a user computing device 22, and communication network(s) 24, although the environment 10 could have other types and/or numbers of other systems, devices, components, and/or other elements in other configurations. This technology provides a number of advantages including network assessment computing devices, methods, and non-transitory computer readable media that provide a simple, continuous, intuitive digital representation of internal and/or external security protection and health of a network environment.

Figure 2:
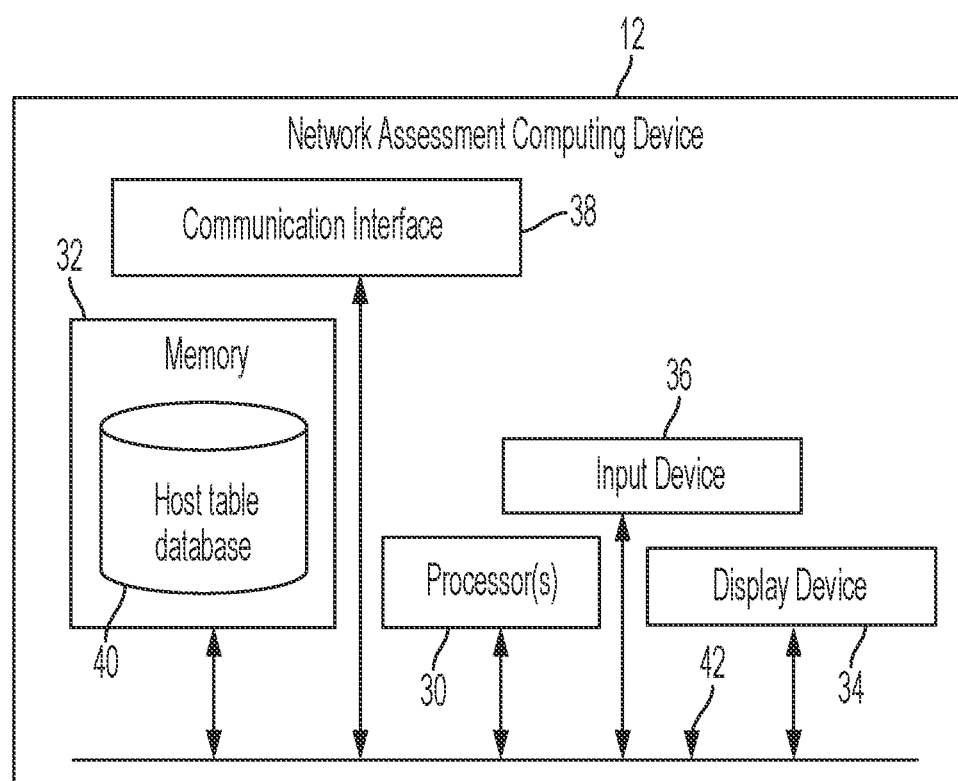
FIG. 2 is a block diagram of an example of a network assessment computing device.
Figure 3A:
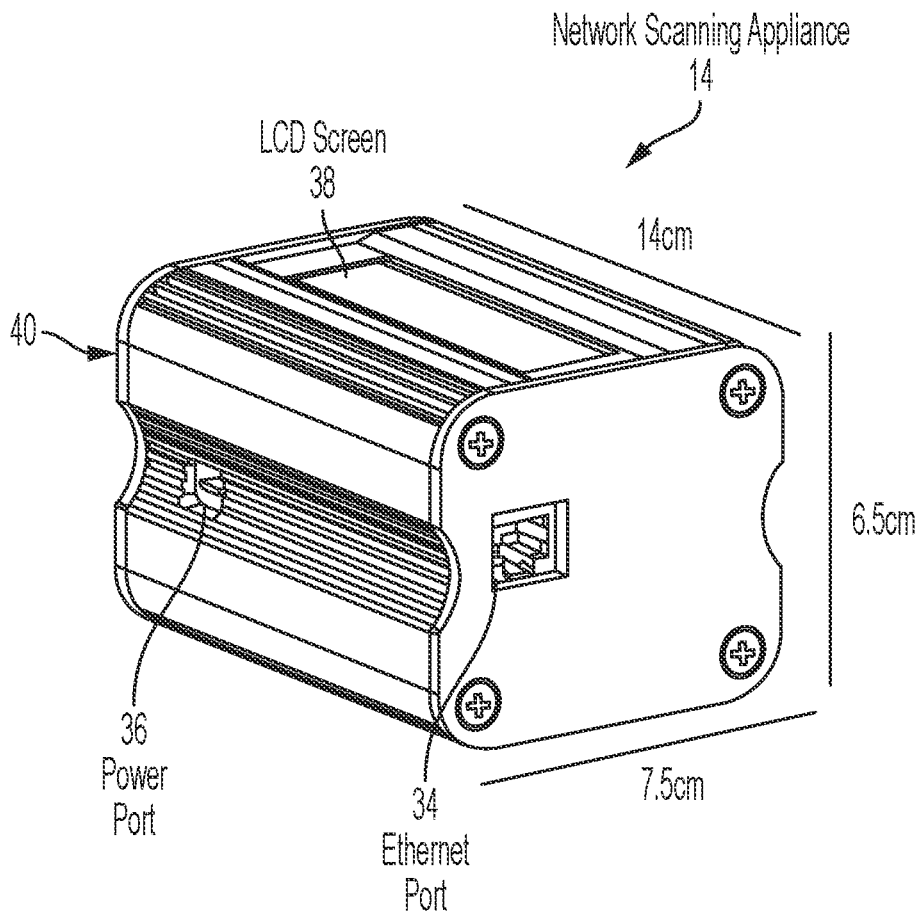
FIG. 3A is a perspective view of the example of the network appliance device.
Figure 3B:
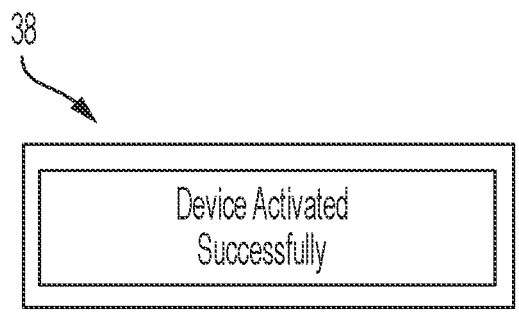
FIG. 3B is a screenshot of a display screen of the network appliance device shown in FIG. 3A.

Referring more specifically to FIGS. 1-3, in this particular example the network environment 10 has the internal network 11(1) with the network scanning appliance 14, client computing devices 16(1)-16(n) and a server 18 coupled via one or more communication network(s) 24. Additionally, the network environment 10 has the external network 11(2) separated from the internal network 11(1) by a firewall 26 and with a secure cloud hosting provider 20 which may have one or more servers and/or databases including the network assessment computing device 12 and with a user computing device 22 coupled via one or more communication network(s) 24, although other types and/or numbers of networks with other systems, devices, components and/or elements in other configurations may be used.

In this particular example, the network assessment computing device 12 with the network scanning appliance 14 may perform a number of functions and/or other actions as illustrated and described by way of the examples herein including conducting and providing an assessment of the levels of security protection and/or health of the internal and/or external network, although the network assessment computing device 12 with the network appliance device 14 may perform other types and/or numbers of other operations, functions and/or actions. Additionally, the network assessment computing device 12 and the network scanning appliance 14 may have other configurations, such as having the network assessment computing device 12 in the internal network 11(1), in the external network 11(2) as shown in this example, and/or may be incorporated within the network scanning appliance 14. Further, in this particular example, the network assessment computing device 12 is an external scanner in a cloud with a secure cloud hosting provider 28 that processes information obtained by the network scanning appliance 14, although other configurations can be used.

The network assessment computing device 12 may include one or more processor(s) 30, a memory 32, an input device 36, a display device 34, and a communication interface 38 which are coupled together by a bus or other communication link 42, although the network assessment computing device 12 can include other types and/or numbers of systems, devices, components and/or other elements in other configurations.

The processor(s) 30 of the network assessment computing device 12 may execute programmed instructions stored in the memory 32 of the network assessment computing device 12 for the any number of the functions and other operations illustrated and described herein. The processor(s) 30 of the network assessment computing device 12 may include one or more CPUs or general purpose processors with one or more processing cores, for example, although other types of processor(s) can also be used.

The memory 32 of the network assessment computing device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 30, can be used for the memory 32. The memory of the network assessment computing device 12 can store one or more applications that can include computer executable instructions that, when executed by the network assessment computing device 12, cause the network assessment computing device 12 to perform actions, such as to assess in near real time or in real time the internal and external security protection and health of a computer based network environment, for example, and to perform other actions as described and illustrated by way of the examples below with reference to FIGS. 1-11. The application(s) can be implemented as modules or components of other applications. Further, the application(s) can be implemented as operating system extensions, module, plugins, or the like. The memory 32 of the network assessment computing device 12 may also include a database host table 40 of the inventory of identified hosts on a network as explained in greater detail by way of the examples herein, such as internal network 11(1) as well as other data and/or instructions, as illustrated and described by way of the examples herein. Additionally, the memory 32 may include a Region Database (RDS), a Plugin Database and API (RDS & EC2), an Administrative Database (RDS), Route 53, and a User API (EC2) as illustrated and described in greater detail below with reference to FIG. 4, although one or more could be in other locations accessible by the network assessment computing device 12. Further, the memory 32 may include a solutions database with one or more solutions for one or more identified vulnerabilities.

The input device 36 may comprise one or more devices, such as a computer mouse, keyboard, and/or interactive touchscreen display of the network assessment computing device 12 by way of example only. Additionally, the display device 34 of the network assessment computing device 12 may comprise any type of viewable device, such as a display screen to display information or may be combined with the input device if an interactive touchscreen display device by way of example only.

The communication interface 38 of the network assessment computing device 12 operatively couples and communicates between the network assessment computing device 12 and the network scanning appliance 14, the user computing devices 16(1)-16(n), the server 18, and/or the user computing device 22 via one or more communication network(s) 24, although other types and/or numbers of connections and/or other communication networks or systems with other types and/or numbers of connections and configurations to other devices and elements can also be used.

The network scanning appliance 14 includes a housing 40 with one or more processors, a memory, an Ethernet port 34, a power port 36, and an LCD screen 38 which are coupled together by a bus or other communication link, although the network scanning appliance 14 can include other types and/or numbers of systems, devices, components, and/or elements in other configurations.

The processor(s) of the network scanning appliance 14 may execute programmed instructions stored in the memory for operations, functions and/or other actions illustrated and described by way of the examples herein. The processor(s) of the network scanning appliance 14 may include one or more CPUs or general purpose processors with one or more processing cores, for example, although other types of processor(s) can also be used.

The memory of the network scanning appliance 14 may store these programmed instructions for one or more aspects of the present technology as described and illustrated herein, although some or all of the programmed instructions could be stored elsewhere, such as in storage on the cloud by way of example only. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory. The memory of the network scanning appliance 14 can store one or more applications that can include computer executable instructions that, when executed by the network scanning appliance 14, cause the network scanning appliance 14 to perform functions and/or other actions and interact with network assessment computing device 12 which is acting as an external scanner in this example as described and illustrated by way of the examples below with reference to FIGS. 1-11. The application(s) can be implemented as modules or components of other applications. Further, the application(s) can be implemented as operating system extensions, module, plugins, or the like.

The Ethernet port 34 of the network scanning appliance 14 in this example may for example be coupled to an Ethernet port of the server 18 or other port or interface in the internal and external networks 11(1) and 11(2), respectively, and also may be operatively coupled to and communicates with the network assessment computing device 12, the user computing device 22, such as for a customer or reseller by way of example only, and the client computing devices 16(1)-16(n) via one or more communication network(s) 24, although other types and/or numbers of connections and/or other communication networks or systems with other types and/or numbers of connections and configurations to other devices and elements can also be used. Additionally, the power port 36 of each of the network scanning appliance 14 may comprises a connection to receive a power source for the network scanning appliance 14, although other types of power connections and/or sources may be used. Further, the LCD screen 38 of the network scanning appliance 14 may display for example information related to the assessment as shown for example in FIG. 3B, although other types and/or numbers of display devices and other types of data and/or other information may be displayed.

The client computing devices 16(1)-16(n) in this example are in the internal network 11(1) and may include any type of computing device, such as mobile computing devices, desktop computing devices, laptop computing devices, tablet computing devices, virtual machines (including cloud-based computers), or the like, although other types and/or numbers of systems, device, components or other elements with an Internet Protocol (IP) address in the internal and/or external networks 11(1) and 11(2) may be used. The client computing devices 16(1)-16(n) in this example may include a processor, a memory, and a communication interface, which are coupled together by a bus or other communication link, although other numbers and types of network devices could be used. The client computing devices 16(1)-16(n) may further include a display device, such as a display screen or touchscreen, and/or an input device, such as a keyboard for example. The client computing devices 16(1)-16(n) may by way of example run interface applications, such as standard Web browsers or standalone client applications, that may provide an interface to make requests for, and receive content stored on, for example the server 18 via one or more of the communication network(s) 24.

The server 18 in the internal network 11(1) in this example may include one or more processors, a memory, and a communication interface which are coupled together by a bus or other communication link, although other types and/or numbers of systems, devices, components and/or other elements may be used and may be located in the internal and/or external network 11(1) and 11(2). Various applications may be operating on the server and transmitting data (e.g., files or Web pages) to one or more of the client computing devices 16(1)-16(n) by way of example only. The server may be hardware or software or may represent a system with multiple servers and/or databases in a pool and may also be in a cloud environment. Further, in this example, the server 18 provides the Ethernet port for coupling an Ethernet cable to the Ethernet port 34 of the network scanning appliance 14, although the network scanning appliance 14 can be coupled to other systems and/or devices and at other locations.

The user computing device 22, such as for a customer or reseller by way of example only, may include one or more processors, a memory, a display device, an input device and a communication interface which are coupled together by a bus or other communication link, although other types and/or numbers of systems, devices, components and/or other elements may be used. The user computing device 22 in this example may interact with the network assessment computing device 12 to obtain assessments and other information and display one or more of the user interfaces as illustrated by way of example only in FIGS. 6-11.

By way of example only, each of the communication network(s) 24 may include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Figure 4:
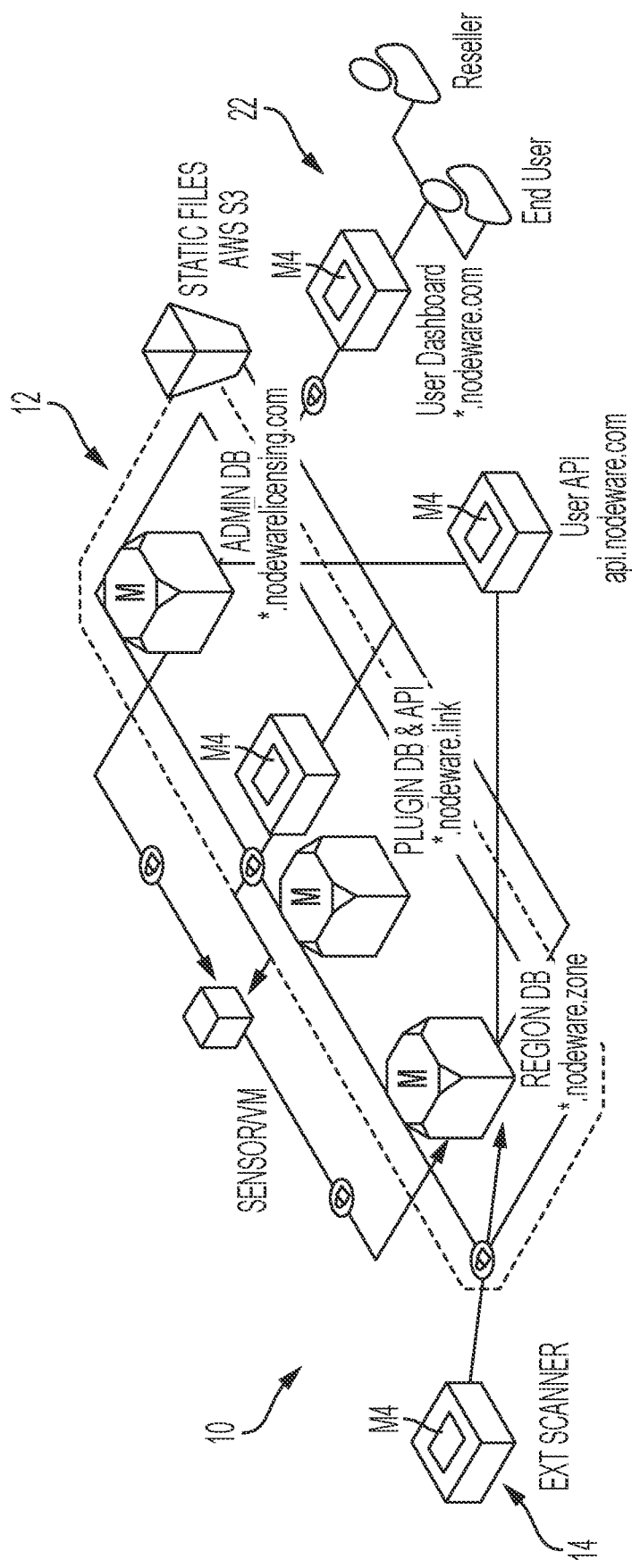
FIG. 4 is a functional block diagram of another example of the environment with the network assessment computing device and the user computing device.

Referring to FIG. 4, a functional block diagram of another example of the environment 10 with the network assessment computing device 12 and the user computing device 22 is illustrated. In this particular example, a cloud infrastructure may comprise the following definitions for the examples illustrated and described herein:

Development—an environment for designing and building web network assessment application;

Testing—an environment for designing and building device logic;

Region Database (RDS)—scalable and geodistributed database housing internal host data which in this particular example may be at least partially stored in, managed, and/or accessed by the network assessment computing device 12;

Plugin Database and API (RDS & EC2)—an environment for serving vulnerability plugin definitions and software updates to the network scanning appliance 14 and providing description and solution information to a web network assessment application for a user computing device 22 which in this particular example may at least be partially stored in, managed, and/or accessed by the network assessment computing device 12;

Administrative Database (RDS)—an environment for validating license keys for the network scanning appliance and authenticating a user at the user computing device 22 for the web network assessment application which in this particular example may be at least partially stored in, managed, and/or accessed by the network assessment computing device 12 by the network assessment computing device 12;

EC2 (Elastic Compute Cloud)—an environment, such as the secure cloud hosting provider 20, for serving the web network assessment application to an end user, such as a customer or reseller at the user computing device 22;

S3 (Simple Storage Service)—a host for static resources, such as CSS, JavaScript, images, system logs from the network appliance that may in this particular example be at least partially stored in the secure cloud hosting provider 20 and/or the memory 32 of the network assessment computing device 12;

Route 53—a domain name system for mapping human readable addresses to machine readable addresses which in this particular example may be used by the network assessment computing device 12;

User API (EC2)—allows an end user, such as one at user computing device 22 by way of example only, to query data in machine readable format for use in third party applications which may be at least partially stored in, managed by, and/or accessed from the network assessment computing device 12;

Internal Scanner (Sensor/VM)—on premise vulnerability scanner for checking internal IP addresses found on the same subnet, such as network scanning appliance 14 by way of example only;

External Scanner—an offsite vulnerability scanner for checking external IP addresses, company informational website, company blog, etc, such as network assessment computing device 12 by way of example only.

Although an example of a network environment 10 with internal and external networks 11(1)-11(2) and a network assessment computing device 12, a network appliance device 14, client computing devices 16(1)-16(n), a server 18, a secure cloud hosting provider 20, and a user computing device 22 which may be coupled together by one or more direct links, such as via an Ethernet connection and/or by one or more communication network(s) 24 are described and illustrated herein, other types and/or numbers of systems, devices, components, and/or elements in other configurations may be used. It is to be understood that the systems of the examples described herein are for example of purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An example of method for assessing in near real time or in real time internal and/or external security protection and/or health of internal and/or external network environments will now be described with reference to FIGS. 1-11. In this particular example, in step 100 an Ethernet cable may be plugged into the Ethernet port 34 of the network scanning appliance 14 and an Ethernet port of the server 18 to couple the network scanning appliance 14 into the internal network 11(1), although the network scanning appliance 14 may be coupled in other manners and/or to another system, device, and/or host. Additionally, in this particular example the network assessment computing device 12 is located in a secure cloud hosting provider 20 in a cloud environment in the external network 11(2), acts as an external scanner interacting with the network scanning appliance 14 via one or more of the communication network(s), although the network assessment computing device 12 could be in other locations and/or may have other configurations, such as being integrated with the network scanning appliance 14 by way of example only.

In step 102, the power port 36 is used to couple the network scanning appliance 14 to a power source (not shown) and once coupled to power is activated, although other manners for providing power to and/or activating the network scanning appliance 14 may be used. In this particular example, once the network scanning appliance 14 is activated, a six digit code is displayed on the LCD screen 38 for authentication with a web network assessment application hosted by the network assessment computing device 12, although the web network assessment application could be hosted by other systems, devices, and/or hosts and/or other codes and/or authentication techniques may be used.

In step 104, a user, such as a customer who installed the network scanning appliance 14 in the internal network 11(1) in this example, may use one of the client computing devices 16(1)-16(n) in the internal network 11(1) or the user computing device 11(2) in the external network 11(2) by way of example only to access a web network assessment application hosted by the network assessment computing device 12 in this particular example. The user may enter the six digit code in this example via one of the client computing devices 16(1)-16(n) or the user computing device 11(2) in this example in an authentication field of the web network assessment application. The entered code may be processed and a validation determination may be made by the network assessment computing device 12 in this example. If in step 104, the entered code from the network scanning appliance 14 is not validated, then the No branch is taken to step 105 where this particular example of the method may end. If in step 104, entered code from the network scanning appliance 14 is validated, then the Yes branch is taken to step 106.

Figure 7:
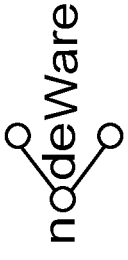
FIG. 7 is a screenshot of an example of a graphical user interface showing a representation of reseller account creation.

In step 106, the user in this example at one of the client computing devices 16(1)-16(n) or at the user computing device 11(2) is prompted by the web network assessment application hosted by the network assessment computing device 12 in this particular example to either login to a previously created user account or create a new user account as illustrated and described by way of the examples herein. By way of example, an example of a screenshot of established customer profiles for previously created user accounts provided by the web network assessment application is illustrated in FIG. 6 and of a screenshot of a reseller account creation provided by the web network assessment application is illustrated in FIG. 7.

In step 108, once the user account is accessed and activation has been initiated, then in this particular example the network scanning appliance 14 in conjunction with the network assessment computing device 12 may begin to execute four different processes as illustrated and described by way of the examples below, although other types and/or numbers of process may be run and/or these process may be executed in different manners. Additionally, once activated in this example these processes continuously operate in parallel at different time intervals as illustrated and described by way of the examples here, although other timing operations could be used.

Figure 5:
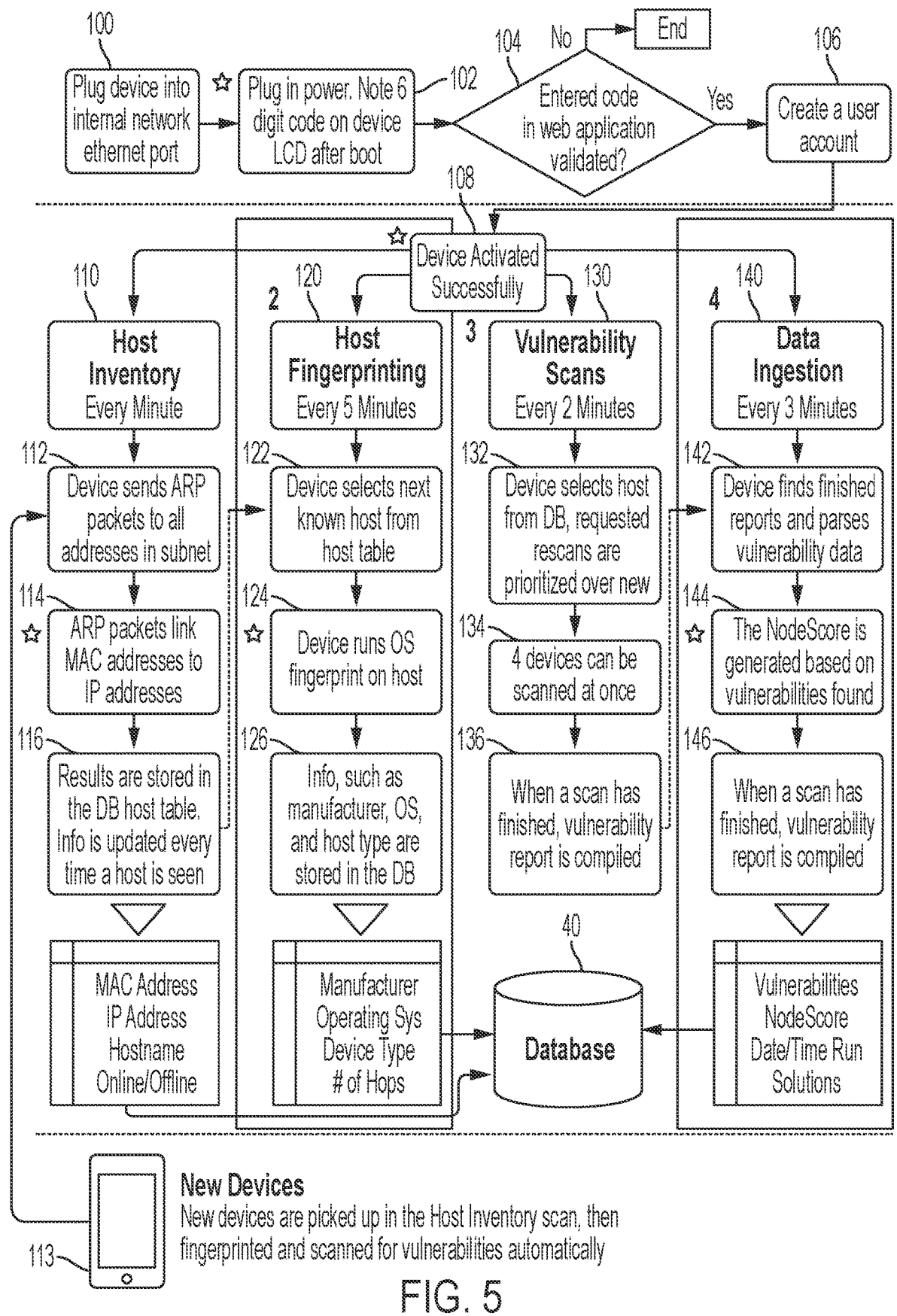
FIG. 5 is a flow chart of an example of a method for assessing in near real time or in real time internal and/or external security protection and/or health of a computer based network environment.

A first process 110 for an example of a method for conducting an inventory is illustrated in FIG. 5. In this particular example, with this process 110 the network scanning appliance 14 with the network assessment computing device 12 may conduct an inventory for all systems, devices, and/or other hosts with an IP address on the internal network 11(1) on a regularly basis, such as every minute by way of example only, and report back any identified systems, devices, and/or other hosts to the network assessment computing device 12, although other types and/or numbers of scanning appliances may be used and/or the identified systems, devices, and/or other hosts may be processed internally and/or sent to other types and/or numbers of assessment systems. With this process 110, the network scanning appliance 14 with the network assessment computing device 12 may begin to scan to individually identify and harvest information on any systems, devices or other hosts, such as computers, phones, televisions or any device that accept an Internet Protocol (IP) address by way of example only, currently on the internal network 11(1) in this example. Once engaged, the network scanning appliance 14 may continue this scan to individually identify and harvest information twenty-four hours per day to capture any devices that enter or leave the internal and/or external network environments. Any new systems, devices, or other hosts entering the internal network 11(1) in this example may be identified by the network scanning appliance 14 and then may be queued by the network assessment computing device 12 for scanning by the network scanning appliance 14 in near real time or in real time. The network assessment computing device 12 may also determine an order of priority for scanning identified devices on the internal and/or external networks be based on harvested data obtained by the network scanning appliance 14.

In this particular example of process 110, in step 112 the network scanning appliance 14 with the network assessment computing device 12 may transmit address resolution protocol (ARP) packets to all addresses for systems, devices, and/or other hosts in for example a subnet or other defined network, such as for a particular organization or other entity on the internal network 11(1), although the ARP packets could be sent to systems, devices, and/or other hosts for another defined network which includes both the internal and/or external networks 11(1) and/or 11(2). Additionally, the network scanning appliance 14 with the network assessment computing device 12 may request or otherwise monitor for or detect other data on or about the systems, devices, and/or other hosts in the subnet or other defined network, such as particular information about each of the systems, devices, and/or other hosts and whether those systems, devices, and/or other hosts are currently on or offline, although other types of information could be requested.

In step 113, one or more new devices may at any time be coupled to or disconnected from the subnet or other defined network being examined, such as the internal network 11(1) in this particular example, and would be identified by this continuous inventory process. The network assessment computing device 12 may include message based alerting (SMS, email or other types of communications by way of example only) that generates and notifies for example the user computing device 22 or one of the client computing devices 16(1)-16(n) if a new system, device or other host with an IP address is identified on the internal and/or external network environments.

In step 114, the network scanning appliance 14 with the network assessment computing device 12 receives all the responses back to this transmission which now links the MAC addresses to IP addresses, although other approaches for conducting a host inventory can be used. Additionally, the network scanning appliance 14 with the network assessment computing device 12 may obtain other data on or about the systems, devices, and/or other hosts in the subnet or other defined network, such as particular information about each of the systems, devices, and/or other hosts and whether those systems, devices, and/or other hosts are currently on or offline, although other types of information could be obtained.

In step 116, the network scanning appliance 14 may transmit the linked MAC addresses to IP addresses as well as other obtained information, such as the MAC address, IP address, hostname, and online or offline status by way of example only, to the host database 40 that may be located in the memory 32 of the network assessment computing device 12, although this information could be stored in other locations. This table in the database host table 40 in memory 32 of the network assessment computing device 12 in this example may be updated every time a new device is identified and/or when any identified device or other host is removed from the internal and/or external network environments.

A second process 120 for an example of a method for fingerprinting each of the identified systems, devices, and/or other hosts on the internal network 11(1) is illustrated in FIG. 5. In this particular example with process 120, the network scanning appliance 14 with the network assessment computing device 12 may conduct fingerprinting for each of the identified systems, devices, and/or other hosts on a regularly basis, such as every five minutes by way of example only, and report data about the identified systems, devices, and/or other hosts to the network assessment computing device 12, although other types of examinations and/or other time intervals could be used.

In this particular example of process 120, in step 122 (following step 116 in which the host inventory is updated) the network scanning appliance 14 with the network assessment computing device 12 may select the next known device or other host from the table of identified systems, devices, and/or hosts stored in the host table database 40 in the memory of the network assessment computing device 12.

In step 124, the network scanning appliance 14 with the network assessment computing device 12 may run an operating system (OS) fingerprint on the selected one of the system, device, and/or other host identified from the table of identified systems, devices, and/or hosts stored in the host table database 40, although other types of examinations can be used and/or the fingerprinting or other examination can be executed by other systems, devices, or hosts, such as the network assessment computing device 12 by way of example only. By executing the operating system (OS) fingerprint, in this particular example the network scanning appliance 14 with the network assessment computing device 12 is able to obtain data on the identified systems, devices, and/or hosts, such as the manufacturer, operating system, host type, and number of hops by way of example only, although other types and/or amounts of data may be obtained. In this particular example, once completed with the current selected one of the systems, devices, or other hosts, the network scanning appliance 14 with the network assessment computing device 12 continues to run the operating system (OS) fingerprint on the next one of the system, device, and/or other host in the queue in the table of identified systems, devices, and/or hosts stored in the host table database 40, although other orders for fingerprinting or otherwise examining could be used. Additionally, in this particular example once the fingerprinting or other examination is completed for a selected one of the systems devices, or other hosts, with respect to that selected one of the systems devices, or other hosts the network scanning appliance 14 may move on to step 126.

In step 126, the network scanning appliance 14 may store the obtained data in the host table database 40 in the memory 32 of the network assessment computing device 12, although the data could be stored at other times and/or in other locations.

A third process 130 for an example of a method for conducting a vulnerability scan on each of the identified systems, devices, and/or other hosts currently identified on the internal network 11(1) is illustrated in FIG. 5. In this particular example, with this process 130 the network scanning appliance 14 with the network assessment computing device 12 may conduct the vulnerability scan for each of the identified systems, devices, and/or other hosts on a regularly basis, such as every two minutes by way of example only, although other types of examinations and/or other time intervals could be used. With this process, the network scanning appliance 14 with the network assessment computing device 12 avoid using vulnerability scanning detection methods that could render an internal and/or external network environment unusable, allowing continuous scanning by the network scanning appliance 14 with the network assessment computing device 12 to take place In this particular example of process 130, in step 132 the network assessment computing device 12 may generate and provide one or more queues of identified systems, devices, or other hosts on the internal and/or external network environments to the network scanning appliance 14 to identify the order for scanning for one or more vulnerabilities, although other manners for determining an order of the vulnerability scan of devices on the internal and/or external network environments may be used. The network assessment computing device 12 may adjust the queue or queues as needed, such as to add in to one of the current queues any newly identified systems, devices, or other hosts on the internal and/or external network environments or to add in any identified systems, devices, or other hosts that may have just gone through a remediation by way of example only. This enables the claimed technology to provide a much more accurate and up to date indication of the current security protection and/or health of identified devices on the internal and/or external network environments. The network assessment computing device 12 may maintain and keeps multiple queues.

Additionally, in this step 132 the network scanning appliance 14 with the network assessment computing device 12 may select one or more of the identified systems, devices, or other hosts for one or more vulnerabilities based on the one or more queues. In this particular example, four of the identified systems, devices, or other hosts are selected for a scan at a time, although other numbers could be used.

In step 134, the network scanning appliance 14 with the network assessment computing device 12 scans the four of the identified systems, devices, or other hosts for any vulnerabilities. By way of example only, the network scanning appliance 14 with the network assessment computing device 12 may use vulnerability scanning software stored in memory 32 in this example for these scans. Once the scan for the four of the identified systems, devices, or other hosts is completed, then the network scanning appliance 14 with the network assessment computing device 12 may move to the next one or more identified systems, devices, or other hosts to scan based on the queues.

In step 136, the network scanning appliance 14 may transmit the results to the network assessment computing device 12 for storage and/or other assessments, although the results could be sent to other locations. By way of example only, the network assessment computing device 12 may conduct one or more assessments and/or generate one or more reports based on the results of the vulnerability scan which may be accessible via the web network assessment application by a registered user for example at one of the client computing devices 16(1)-16(n) or at user computing device 22.

A fourth process 140 for an example of a method for ingesting and processing of the results of the vulnerability scan and other generated reports is illustrated in FIG. 5. In this particular example, with this process 140 the network scanning appliance 14 with the network assessment computing device 12 may ingest the results of the vulnerability scan and other generated reports about each of the identified systems, devices, and/or other hosts as completed and on a regularly basis, such as every three minutes by way of example only, although other types of procedures for processing this data and/or other time intervals could be used.

In this particular example of process 140, in step 142 (following step 136) the network assessment computing device 12 parses the vulnerability data from the obtained results of the vulnerability scan and other generated reports.

In step 144, the network assessment computing device 12 may generate one or more scores and/or other assessments based on the parsed vulnerability data obtained for each of the identified systems, devices, and/or other hosts as completed, although other types of examinations and/or at other time intervals could be used. The network assessment computing device 12 may include message based alerting (SMS, email or other types of communications by way of example only) that generates and notifies for example the user computing device 22 or one of the client computing devices 16(1)-16(n) if a vulnerability scan identifies an actionable item, such as a vulnerability score above a threshold by way of example only.

Figure 8:
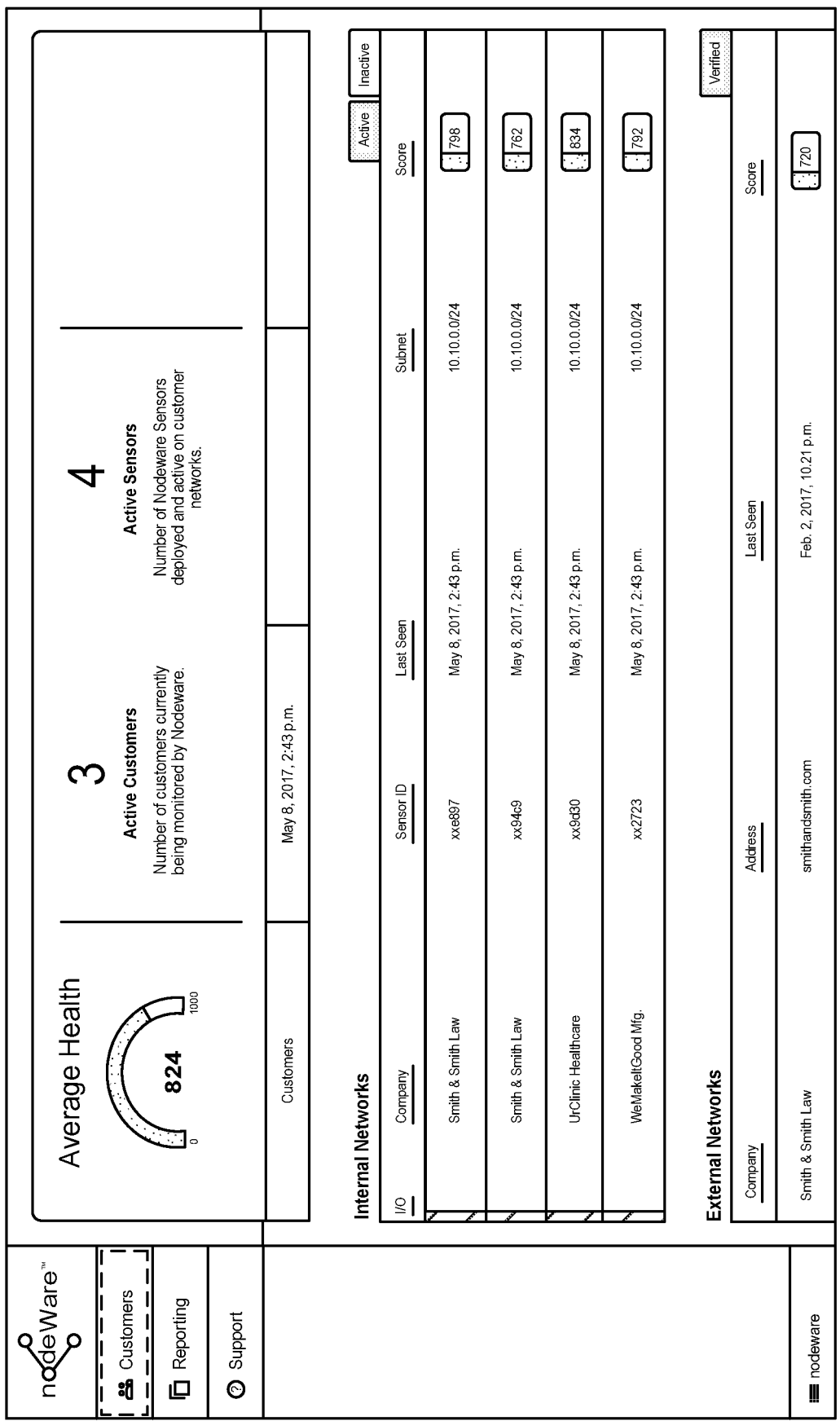
FIG. 8 is a screenshot of an example of a graphical user interface showing a representation of average health.
Figure 9:
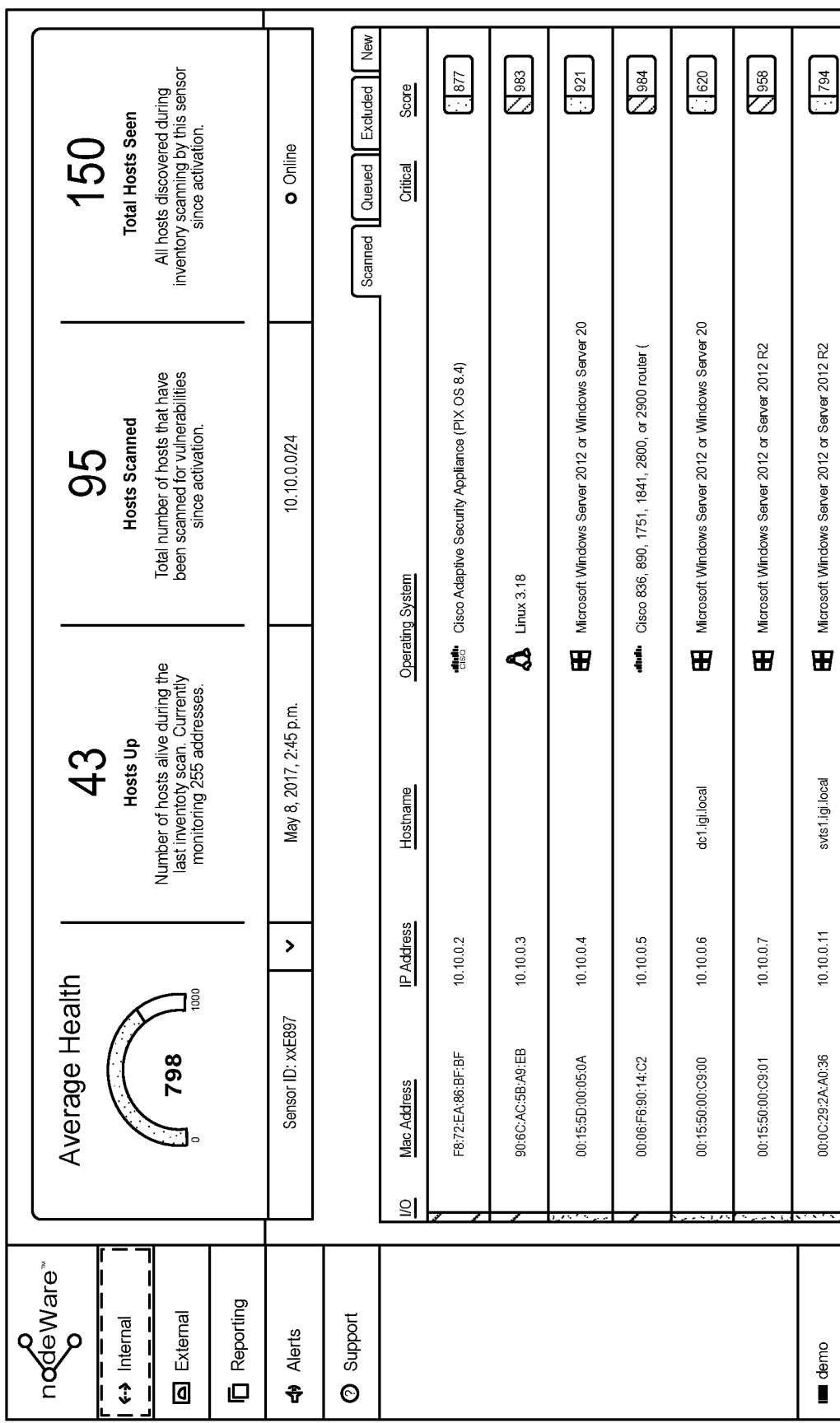
FIG. 9 is a screenshot of an example of a graphical user interface showing a representation of network health.
Figure 10:
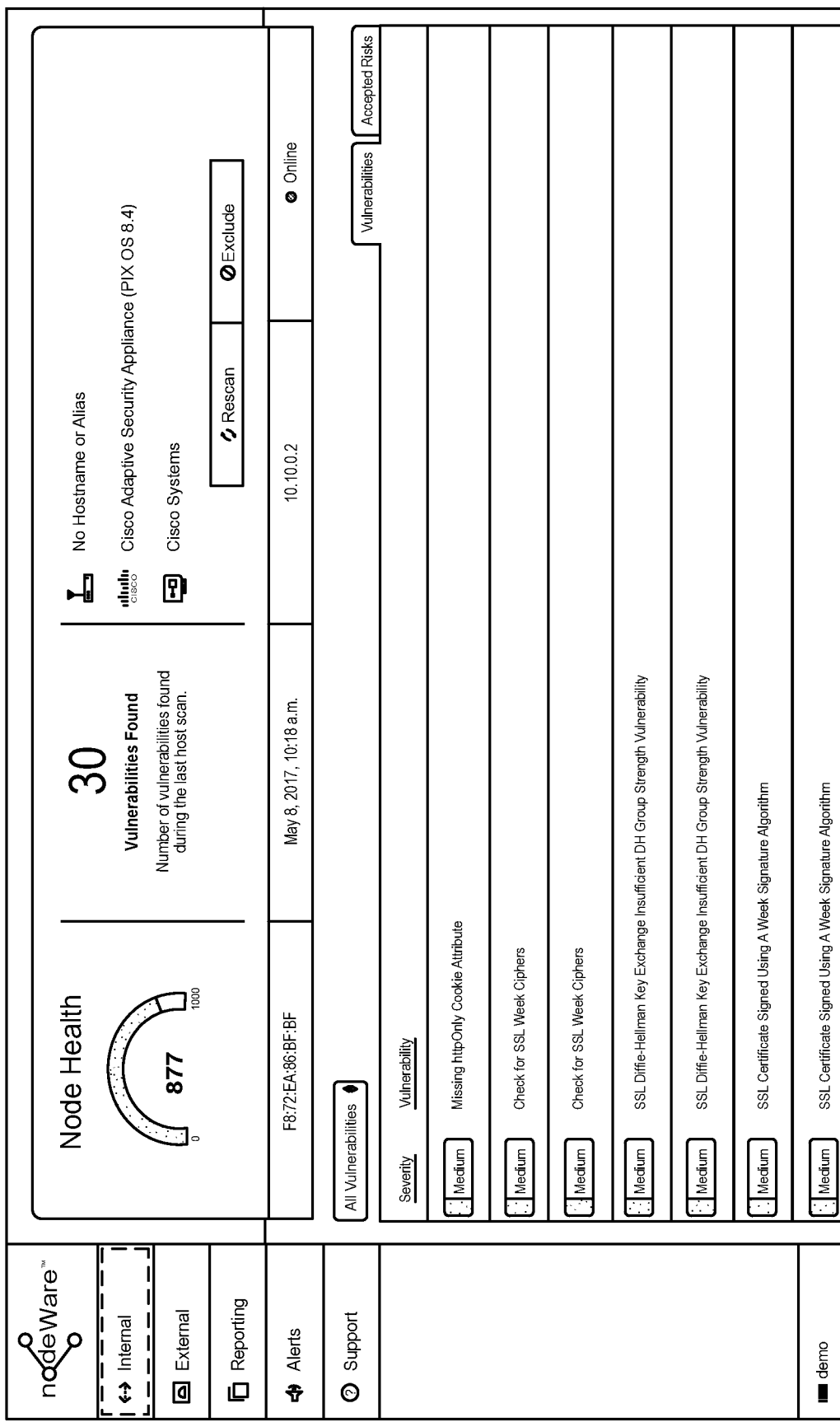
FIG. 10 is a screenshot of an example of a graphical user interface showing a representation of node health including vulnerabilities found.

In step 146, once the one or more scores and/or other assessments are completed, the network assessment computing device 12 may generate one or more assessments reports along with identify one or more actionable items and/or recommendations for any stored solutions, such as in memory 32 by way of example only, which may be accessible by for example the web network assessment application. In this particular example, the network assessment computing device 12 may also utilize a five category vulnerability ranking to apply and provide based on the vulnerability scanning and assessment comprising: Info; Low; Medium; High; and Critical, although other types and/or number of vulnerability categorizations may be used. By way of example only, the network assessment computing device 12 may generate and provide a user interface display with the score and/or assessment results as illustrated in FIGS. 8-11. In this particular example, a screenshot of an example of a graphical user interface showing a representation of average health is shown in FIG. 8, a screenshot of an example of a graphical user interface showing a representation of network health is shown in FIG. 9, a screenshot of an example of a graphical user interface showing a representation of node health including vulnerabilities found is shown in FIG. 10, and a screenshot of an example of a graphical user interface showing a representation of node health with a risk level of an identified vulnerability is shown in FIG. 11.

When any system, device or other element is still unknown, the network assessment computing device 12 may assume a stored or input default score until an assessment can be made and score generated, such as a medium risk score. By way of example only, the generated scores for assessing security protection and/or health may range from 0 (critical) to 1000 (no known vulnerabilities), although other ranges can be used. Additionally, by way of example only, the breakdown of the ranges of generated scores may be associated with a color related to a current assessed state of security protection and/or health, such as a: Red Range from 0-500; Yellow Range from 501-949; and Green Range from 950-1000, although other colors and/or ranges may be used depending on the particular applications.

Further, an example of an algorithm for the network assessment computing device 12 to calculate a security protection and/or health score for an identified device on the internal or external network environment may in one example be as follows:

$$x=1000-(((c*5*(1+c*0.1)+(h*3*(1+h*0.1))+(m*1*(1+m*0.1))+(1*0.1*(1+1*0.1))+(i*0.01*(1+i*0.000001))$$

x=score, c=critical, h=high, m=medium, l=low, i=informational

Each of the identified systems, devices, and/or other hosts currently on the internal network 11(1) in this example may be assigned a score generated by the network assessment computing device 12 based on for example a number of assessed vulnerabilities in each one or more categories based on the device data obtained by the network scanning appliance 14. With respect to these generated scores, the network assessment computing device 12 may generate and provide a user interface for display on for example one of the user computing device 22 and/or one of the client computing devices 16(1)-16(n) with a list of the identified, scanned and assessed devices and their relative vulnerabilities and generated scores as illustrated by way of example in FIG. 9. Additionally, the network assessment computing device 12 may generate and provide on for example one of the user computing device 22 and/or one of the client computing devices 16(1)-16(n) a user interface display with actionable information related to each of the identified, scanned and assessed devices on the internal and/or external network environments based on the assessments, such as in FIGS. 8 and 10 by way of example only. The network assessment computing device 12 may also for any generated scores below a threshold with an actionable item or items may identify and provide to for example one of the user computing device 22 and/or one of the client computing devices 16(1)-16(n) one or more corresponding stored solutions from a solutions database, such as in memory 32 by way of example, based on the determined assessment(s).

In step 148, the one or more scores and/or other assessments as well as any generated reports may be stored in host table database 40 in memory 32 by the network assessment computing device 12, although the information could be stored in other locations.

As illustrated and described with the examples above, with this technology an identified system, device or other host may be moved up the queue when first identified for scanning so there is no delay in assessment for any vulnerability. Additionally, with this technology in at or near real time, once scanning of an identified system, device or other host is completed the network assessment computing device 12 may generate and provide an alert to for example the user computing device 22 or one of the client computing devices 16(1)-16(n) of the vulnerability level and top severalties found.

Further, with this technology after remediation on a specific endpoint/IP address for one of the identified systems, devices or other hosts on the internal and/or external network 11(1) and/or 11(2), the network scanning appliance 14 can rescan that specific endpoint individually and the network assessment computing device 12 can assess the results of the scan for a real time or near real time confirmation that the remediation was successful and the vulnerability has been eliminated or mitigated as illustrated in FIGS. 8-11. The network assessment computing device 12 may be able to identify and execute defined pathways for remediation of vulnerabilities found on the network environment from a solutions database or other source, such as one stored by way of example in memory 32.

This technology also allows the network assessment computing device 12 customization of the assessment of vulnerabilities for false positives or false negatives and/or acceptance of known risks of certain devices or other hosts. The network assessment computing device 12 may also generate an audit trail including of any known vulnerability that has been accepted as a risk. Future scans by the network assessment computing device 12 will ignore that specific vulnerability across the entire network environment.

Even further, this technology individually and continually scans and identifies systems, devices, and/or other hosts including any new systems, devices, an/or other hosts, lessens the time from identification to scanning and assessment of security protection and/or health by the network assessment computing device 12. Additionally, with this claimed technology, after any remediation work on any system device, and/or other host with a security protection and/or health issue, that system device, and/or other host may be entered into the queue and quickly rescanned by the network scanning appliance 14 to provide data for an updated assessment of security protection and/or health by the network assessment computing device 12.

Accordingly as illustrated and described by way of the examples herein, the claimed technology continuously assesses and provides a simple, intuitive digital representation of the internal and external security protection and/or health of a computer based network. Additionally this claimed technology is able to deliver pertinent health information about vulnerable computers, phones, tablets, mainframes, HVAC systems, cameras, televisions or any device that has an Internet Protocol (IP) address in near real time or in real time. The claimed technology also provides the assessment using a uniquely generated score that enables an end user or managed service provider to quickly identify and take any necessary corrective actions, such as taking correction actions to prevent hackers from gaining access to their network environment and connected computing devices. Further, the claimed technology may be used with a variety of different types of devices, such as cable modems, set top boxes, and other devices that have IP and MAC addresses. The claimed technology also can update one or more vulnerability definitions, one or more remediation definitions and one or more fingerprinting databases on demand for the assessing each of the identified systems, devices or other hosts for one or more vulnerabilities to address real time discovery of vulnerabilities and notifications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for assessing a network environment, the method comprising:
    individually identifying and harvesting, by a computing device, by executing a scan originally initiated from a network scanning appliance device to obtain identification information for one or more devices each with an Internet Protocol address currently on a defined network in a network environment based on responses to address resolution packets transmitted by the network scanning appliance device to all Internet Protocol addresses on the defined network in the network environment, wherein the network appliance device is separate from each of the one or more identified devices and coupled to the network environment;
    executing, by the computing device, operating system fingerprinting on a periodic basis with the network scanning appliance device to obtain updated device data on each of the identified devices;
    assessing, by the computing device with the network scanning appliance device, each of the identified devices for one or more vulnerabilities;
    generating, by the computing device, network status data and any actionable items for the identified devices for the one or more vulnerabilities based on the assessing; and
    providing, by the computing device, the generated status data and any actionable items.

2. The method as set forth in claim 1 wherein the individually identifying and harvesting with the network scanning appliance device identification information for the one or more devices and the assessing each of the identified devices for one or more vulnerabilities is executed on a continuous basis at adjustable time periods.

3. The method of claim 1, further comprising:
    generating, by the computing device, one or more queues for an order for the scanning of the identified devices.

4. The method of claim 3 further comprising:
    determining, by the computing device, when one or more of the identified devices leaves the network environment or when one or more new devices join on the network environment; and
    adjusting, by the computing device, one or more of the generated queues based on the determination of the one or more of the identified devices that leave or on the one or more of the new identified devices that decides that join.

5. The method of claim 3 further comprising:
    adjusting, by the computing device, one of the generated queues to add one of the one or more of the identified devices after an indication is received that a remediation has been completed.

6. The method of claim 5, further comprising:
    identifying and providing, by the computing device, one or more solutions from a solutions database based on the assessing for the one or more vulnerabilities.

7. The method of claim 5, further comprising:
    adjusting, by the computing device, the assessing for at least one of the one or more vulnerabilities.

8. The method of claim 6, further comprising:
    generating, by the computing device, audit trail data based on the assessing.

9. The method of claim 6, further comprising:
    updating, by the computing device, one or more vulnerability definitions, one or more remediation definitions and one or more fingerprinting databases on demand for the assessing each of the identified devices for one or more vulnerabilities.

10. A network assessment computing system, comprising:
    a network scanning appliance device;
    a memory comprising programmed instructions stored in the memory and one or more processors coupled to the network scanning appliance device and configured to be capable of executing the programmed instructions stored in the memory to:
        individually identify and harvest by executing a scan originally initiated from a network scanning appliance device to obtain identification information for one or more devices each with an Internet Protocol address currently on a defined network in a network environment based on responses to address resolution packets transmitted by the network scanning appliance device to all Internet Protocol addresses on the defined network in the network environment, wherein the network scanning appliance device is separate from each of the one or more identified devices and coupled to the network environment;
        execute operating system fingerprinting on a periodic basis with the network scanning appliance device to obtain updated device data on each of the identified devices;
        assess each of the identified devices for one or more vulnerabilities with the network scanning appliance device;
        generate network status data and any actionable items for the identified devices for the one or more vulnerabilities based on the assessing; and
        provide the generated status data and any actionable items.

11. The system as set forth in claim 10 wherein the individually identify and harvest with the network scanning appliance device the identification information for the one or more devices and the assess each of the identified devices for one or more vulnerabilities is executed on a continuous basis at adjustable time periods.

12. The system of claim 10, wherein the one or more processors are further configured to be capable of executing the programmed instructions stored in the memory to:
    generate one or more queues for an order for the scanning of the identified devices.

13. The system of claim 12 wherein the one or more processors are further configured to be capable of executing the programmed instructions stored in the memory to:

determine when one or more of the identified devices leaves the network environment or when one or more new devices join on the network environment; and adjust one or more of the generated queues based on the determination of the one or more of the identified devices that leave or on the one or more of the new identified devices that decides that join.

14. The system of claim 12 wherein the one or more processors are further configured to be capable of executing the programmed instructions stored in the memory to:

adjust one of the generated queues to add one of the one or more of the identified devices after an indication is received that a remediation has been completed.

15. The system of claim 14, wherein the one or more processors are further configured to be capable of executing the programmed instructions stored in the memory to:

identify and provide one or more solutions from a solutions database based on the assessing for the one or more vulnerabilities.

16. The system of claim 14, wherein the one or more processors are further configured to be capable of executing the programmed instructions stored in the memory to:

adjust the assessing for at least one of the one or more vulnerabilities.

17. The system of claim 10, wherein the one or more processors are further configured to be capable of executing the programmed instructions stored in the memory to:

generate audit trail data based on the assessing.

18. The system of claim 10, wherein the one or more processors are further configured to be capable of executing the programmed instructions stored in the memory to:

update one or more vulnerability definitions, one or more remediation definitions and one or more fingerprinting databases on demand for the assessing each of the identified devices for one or more vulnerabilities.

19. A non-transitory computer readable medium having stored thereon instructions for assessing a network environment comprising executable code which when executed by one or more processors, causes the processors to perform steps comprising:

individually identifying and harvesting by executing a scan originally initiated from a network scanning appliance device to obtain identification information for one or more devices each with an Internet Protocol address currently on a defined network in a network environment based on responses to address resolution packets transmitted by the network scanning appliance device to all Internet Protocol addresses on the defined network in the network environment, wherein the network scanning appliance device is separate from each of the one or more identified devices and coupled to the network environment;

executing operating system fingerprinting on a periodic basis with the network scanning appliance device to obtain updated device data on each of the identified devices;

assessing each of the identified devices for one or more vulnerabilities with the network scanning appliance device;

generating network status data and any actionable items for the identified devices for the one or more vulnerabilities based on the assessing; and providing the generated status data and any actionable items.

20. The method as set forth in claim 19 wherein the individually identifying and harvesting with the network scanning appliance device the identification information for the one or more devices and the assessing each of the identified devices for one or more vulnerabilities is executed on a continuous basis at adjustable time periods.

21. The medium of claim 19, further comprising:
generating one or more queues for an order for the scanning of the identified devices.

22. The medium of claim 19 further comprising:
determining when one or more of the identified devices leaves the network environment or when one or more new devices join on the network environment; and
adjusting one or more of the generated queues based on the determination of the one or more of the identified devices that leave or on the one or more of the new identified devices that decides that join.

23. The medium of claim 19 further comprising:
adjusting one of the generated queues to add one of the one or more of the identified devices after an indication is received that a remediation has been completed.

24. The medium of claim 23, further comprising:
identifying and providing one or more solutions from a solutions database based on the assessing for the one or more vulnerabilities.

25. The medium of claim 23, further comprising:
adjusting the assessing for at least one of the one or more vulnerabilities.

26. The medium of claim 19, further comprising:
generating audit trail data based on the assessing.

27. The medium of claim 19, further comprising:
updating one or more vulnerability definitions, one or more remediation definitions and one or more fingerprinting databases on demand for the assessing each of the identified devices for one or more vulnerabilities.

* * * * *